T. A. DODGE.
Hydraulic Hose.
No. 150,304. Patented April 28, 1874.
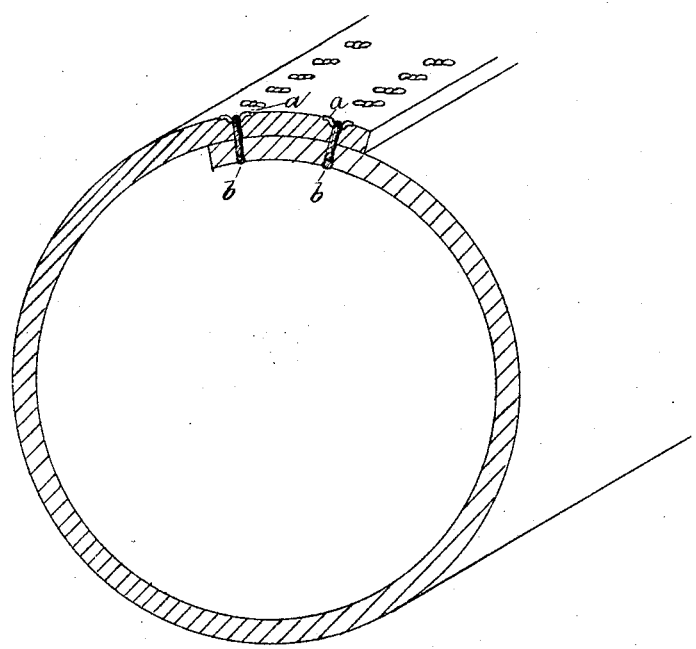
Witnesses.
Geo. T. Smallwood,
Carlos Niekenlooper
Inventor.
Theodore A. Dodge.
per John J. Halsted.
Atty

UNITED STATES PATENT OFFICE.

THEODORE A. DODGE, OF CAMBRIDGE, MASSACHUSETTS.

IMPROVEMENT IN HYDRAULIC HOSE.

Specification forming part of Letters Patent No. 150,304, dated April 28, 1874; application filed April 11, 1874.

*To all whom it may concern:*

Be it known that I, THEODORE A. DODGE, of Cambridge, in the county of Middlesex and State of Massachusetts, have invented an Improvement in Hydraulic Hose; and I do hereby declare that the following, taken in connection with the drawings which accompany and form part of this specification, is a description of my invention sufficient to enable those skilled in the art to practice it.

In the manufacture of hydraulic hose, where each section of hose is formed of a strip having its edges lapped and united by suitable fastenings, thread sewing or stitching has been and is used to a considerable extent to effect the permanent union of the lapped edges. As fire-engine hose is subjected to very severe wear and attrition in being dragged over pavements, it is sometimes a great desideratum to be able to remove the thread from the outer surface of the tubular structure, and to protect each stitch by a fender that shall stand between it and the surface over which the hose may be dragged.

It is the purpose of this invention to effect this protection, and the object is attained by making the union by means of wire and thread, the inner portion of the seam being thread and the outer portion wire. Preferably, the seam consists of a continuous thread within the tube, and having for each stitch or fastening a bow passed through the parts to be united, and secured by a short length of wire, or a wire bow with hooking ends, the thread being drawn back after the wire is inserted, and the wire sinking into the outer surface, being stopped in one direction by its hooks, and in the opposite direction by the thread. The union is preferably effected by an organization similar to that shown in United States Letters Patent Nos. 86,592 and 146,280, modified for the peculiar work to be done.

In hose made of a strip of woven material, the opposite edges of which are lapped and united by suitable fastenings, and especially when the strip is inner surfaced with rubber, the hose being vulcanized, the presence of metal fastenings at the inner surface is objectionable because of their oxidation at such surface, and because they interfere with the proper vulcanization of the rubber coating, and thereby cause leakages; but with my invention, I secure the advantage resulting from the metal fastening at the outer side of the hose and a fastening at the inner surface that oxidizes no faster than the material of which the hose is made, and that in no way interferes with the perfect vulcanization of the rubber which may form the inner surface of the tube.

The parts may be united by one seam, or by two or more parallel seams, and the parts to be united may be formed with inner or outer welts, or with both or neither; and, in fact, the construction, with the exception of the peculiar union of the lapped edges, may be like any of the constructions of hose known to which such union is adapted.

The drawing shows in outside view and in section a piece of hose embodying the invention.

*a a* denote the wires, and *b* the thread.

I claim—

Hydraulic hose having the edges united by the interlocked wire and thread, substantially as shown and described.

THEO. A. DODGE.

Witnesses:
FRANCIS GOULD,
M. W. FROTHINGHAM.